(12) United States Patent
Ji et al.

(10) Patent No.: US 11,990,643 B2
(45) Date of Patent: May 21, 2024

(54) SEPARATOR HAVING INORGANIC COMPOSITE LAYER INCLUDING INORGANIC PARTICLES AND ONE-DIMENSIONAL INORGANIC MATERIAL WITHOUT POLYMER-BASED ORGANIC BINDER AND ELECTROCHEMICAL DEVICE USING THE SAME

(71) Applicants: SK Innovation Co., Ltd., Seoul (KR); SK ie technology Co., Ltd., Seoul (KR)

(72) Inventors: Sang Yoon Ji, Daejeon (KR); Yun Bong Kim, Daejeon (KR); Dong Yeon Lee, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 107 days.

(21) Appl. No.: 17/367,783

(22) Filed: Jul. 6, 2021

(65) Prior Publication Data
US 2022/0013863 A1    Jan. 13, 2022

(30) Foreign Application Priority Data

Jul. 7, 2020    (KR) .................. 10-2020-0083703
Jun. 9, 2021    (KR) .................. 10-2021-0074546

(51) Int. Cl.
*H01M 50/451* (2021.01)
*H01M 10/0525* (2010.01)
(Continued)

(52) U.S. Cl.
CPC ..... *H01M 50/451* (2021.01); *H01M 10/0525* (2013.01); *H01M 50/403* (2021.01); *H01M 50/491* (2021.01)

(58) Field of Classification Search
CPC . H01M 50/451; H01M 50/403; H01M 50/491
(Continued)

(56) References Cited

U.S. PATENT DOCUMENTS 11,031,656 B2    6/2021    Lee et al.
2006/0078791 A1*   4/2006    Hennige ............. H01M 50/434
                                                         429/251
(Continued)

FOREIGN PATENT DOCUMENTS

CN    105489819 A    4/2016
CN    109167004 A    1/2019
(Continued)

OTHER PUBLICATIONS

"Latex" in New Oxford American Dictionary, edited by Stevenson, Angus, and Christine A. Lindberg, Oxford University Press, 2010.

*Primary Examiner* — Sean P Cullen
(74) *Attorney, Agent, or Firm* — The Webb Law Firm (57) ABSTRACT

The present invention relates to a separator including: (a) a porous substrate; and (b) an inorganic composite layer formed on one surface or both surfaces of the porous substrate, and including one or more inorganic particles and one or more one-dimensional inorganic materials, wherein the dimensions of the one or more inorganic particles and the one or more one-dimensional inorganic materials are different, wherein the one or more one-dimensional inorganic materials include inorganic nanowire(s) and/or inorganic nanofiber(s), wherein the one or more inorganic particles may be bound to each other, or the inorganic composite layer may be anchored and adhered to the porous substrate, by the one or more one-dimensional inorganic materials, and the inorganic composite layer does not include a polymer-based organic binder.

14 Claims, 4 Drawing Sheets

(51) Int. Cl.
*H01M 50/403* (2021.01)
*H01M 50/491* (2021.01)

(58) Field of Classification Search
USPC .................................. 429/144, 251, 252, 254
See application file for complete search history.

(56) References Cited

U.S. PATENT DOCUMENTS

| | | | |
|---|---|---|---|
| 2007/0264577 | A1 | 11/2007 | Katayama et al. |
| 2009/0067119 | A1 | 3/2009 | Katayama et al. |
| 2009/0311418 | A1* | 12/2009 | Hennige .................. C08J 7/043 427/101 |
| 2010/0291292 | A1* | 11/2010 | Hennige ................ D06M 11/48 427/126.3 |
| 2017/0025658 | A1 | 1/2017 | Shi et al. |
| 2017/0133653 | A1 | 5/2017 | Lee et al. |
| 2017/0170515 | A1* | 6/2017 | Yushin ................ H01M 50/431 |
| 2017/0346062 | A1 | 11/2017 | Wong et al. |
| 2019/0131604 | A1 | 5/2019 | Yoon et al. |
| 2019/0198837 | A1* | 6/2019 | Yushin ................ H01M 50/446 |
| 2020/0373538 | A1 | 11/2020 | Kim et al. |

FOREIGN PATENT DOCUMENTS

| | | |
|---|---|---|
| CN | 109167013 A | 1/2019 |
| CN | 109320134 A | 2/2019 |
| EP | 2234196 A1 | 9/2010 |
| JP | 2005339938 A * | 12/2005 |
| JP | 200866094 A | 3/2008 |
| JP | 201056037 A | 3/2010 |
| JP | 2013222581 A | 10/2013 |
| JP | 201639138 A | 3/2016 |
| KR | 101535199 B1 | 7/2015 |
| KR | 1020190067397 A | 6/2019 |
| WO | 2014208596 A1 | 12/2014 |

* cited by examiner

SEPARATOR HAVING INORGANIC COMPOSITE LAYER INCLUDING INORGANIC PARTICLES AND ONE-DIMENSIONAL INORGANIC MATERIAL WITHOUT POLYMER-BASED ORGANIC BINDER AND ELECTROCHEMICAL DEVICE USING THE SAME

CROSS-REFERENCE TO RELATED APPLICATIONS

This application claims priority to Korean Patent Application No. 10-2020-0083703 filed Jul. 7, 2020 and Korean Patent Application No. 10-2021-0074546 filed Jun. 9, 2021, the disclosures of which are hereby incorporated by reference in their entireties.

BACKGROUND OF THE INVENTION

Field of the Invention

The following disclosure relates to a separator and an electrochemical device using the same, and more particularly, to a separator which has significantly low thermal contraction and minimizes an increase in resistance even at a high temperature as compared with a separator having a porous inorganic particle layer formed on a porous substrate according to the related art, and an electrochemical device using the same.

Description of Related Art

Recently, in accordance with a high capacity and a large size of a secondary battery for application in an electric vehicle or the like, it is significantly important to secure safety of the battery.

The safety of the battery may be realized, for example, by preventing ignition of the battery caused by a forced internal short circuit due to an external impact. The safety of the battery is secured by forming, on an entire area of a porous substrate formed of a polyolefin or the like, an inorganic particle layer in which inorganic particles and a polymer-based organic binder are included, the inorganic particles are bound to each other by the organic binder, and the organic binder serves to adhere the inorganic particle layer to the porous substrate.

That is, a general polymer-based organic binder is used to adhere the inorganic particle layer onto the porous substrate and to bind and fix the inorganic particles in the inorganic particle layer when the inorganic particle layer is formed on the porous substrate formed of a polyolefin or the like.

However, in a case where such a polymer-based organic binder is used, a chemical reaction occurs between an electrolyte of the battery and the polymer-based organic binder component, resulting in deformation of the components, generation of gas, and a gas leak due to heat. As a result, a lifespan of the battery may be shortened.

In addition, the polymer-based organic binder is dissolved in the electrolyte and eluted, resulting in deterioration of the performance of the electrolyte or deterioration of the performance of the battery such as clogging of a pore layer or an increase in volume of the battery caused by swelling of the organic binder due to the electrolyte.

As a result of conducting intensive studies to solve the above problems, the present inventors found that the above problems may be solved by providing a separator including a porous substrate and an inorganic composite layer formed on the porous substrate and including inorganic particles and a one-dimensional inorganic material, wherein the dimensions of the particles and the material are different, thereby completing the present invention.

RELATED ART DOCUMENT

Patent Document (Patent Document 1) Korean Patent Laid-Open Publication No. 10-2019-0067397 (Jun. 17, 2019)

SUMMARY OF THE INVENTION

An embodiment of the present invention is directed to providing a new separator having sufficient adhesive force without using a polymer-based organic binder having insufficient chemical stability by adopting a porous inorganic composite layer formed on a porous substrate and obtained by mixing inorganic particles and a one-dimensional inorganic material with each other.

Another embodiment of the present invention is directed to providing a separator capable of preventing ignition or rupture of a battery caused by an abnormal phenomenon such as a rapid rise in temperature due to its improved heat resistance.

Still another embodiment of the present invention is directed to providing a separator having chemical stability and excellent electrical properties without using a polymer-based organic binder by binding particles in an inorganic composite layer and adhering the inorganic composite layer to a porous substrate using a one-dimensional inorganic material, and an electrochemical device using the same.

Still another embodiment of the present invention is directed to providing a separator capable of preventing a change in performance of a battery over time.

Still another embodiment of the present invention is directed to providing an electrochemical device in which an organic binder that chemically reacts with the battery's electrolyte or may be dissolved in the electrolyte is not used, and clogging of a pore layer or an increase in volume of the battery caused by swelling due to the electrolyte does not occur.

In one general aspect, the inventive separator includes: (a) a porous substrate; and (b) an inorganic composite layer formed on one surface or both surfaces of the porous substrate, and including inorganic particles and a one-dimensional inorganic material, wherein the dimensions of the particles and the material are different, and the inorganic composite layer does not include a polymer-based organic.

The one-dimensional inorganic material may be one or two or more selected from an inorganic nanowire and an inorganic nanofiber.

The one-dimensional inorganic material may have a diameter of 1 to 100 nm and a length of 0.01 to 100 μm.

The one-dimensional inorganic material may be formed of one or two or more selected from a metal, carbon, metal oxide, metal nitride, metal carbide, metal carbonate, metal hydrate, and metal carbonitride.

The one-dimensional inorganic material may be formed of one or two or more selected from boehmite, $Ga_2O_3$, SiC, $SiC_2$, quartz, NiSi, Ag, Au, Cu, Ag—Ni, ZnS, $Al_2O_3$, $TiO_2$, $CeO_2$, MgO, NiO, $Y_2O_3$, CaO, $SrTiO_3$, $SnO_2$, ZnO, and $ZrO_2$.

The inorganic particle may be formed of one or two or more selected from metal oxide, metal nitride, metal carbide, metal carbonate, metal hydrate, and metal carbonitride.

The inorganic particle may be formed of one or two or more selected from boehmite, $Al_2O_3$, $TiO_2$, $CeO_2$, MgO, NiO, $Y_2O_3$, CaO, $SrTiO_3$, $SnO_2$, ZnO, and $ZrO_2$.

A size of a largest dimension of the inorganic particle may be 0.001 to 20 μm.

A content of the inorganic particles may be 50 to 99.9 wt % with respect to a total content of the inorganic particles and the one-dimensional inorganic material.

The inorganic composite layer may further include organic particles in an amount of 0.1 to 40 parts by weight with respect to 100 parts by weight of the inorganic particles.

The porous substrate may be formed of one or more selected from the group consisting of high-density polyethylene, low-density polyethylene, linear low-density polyethylene, ultra-high molecular weight polyethylene, polypropylene, and copolymers thereof.

A thickness of the separator may be 5 to 100 μm.

An overall pore size of the separator may be 0.001 to 10 μm, and an overall porosity of the separator may be 5 to 95%.

In another general aspect, an electrochemical device includes a cathode, an anode, a separator, and an electrolyte, wherein the separator is the separator described above.

The electrochemical device may be a lithium secondary battery.

In still another general aspect, a method of manufacturing the inventive separator includes: coating a dispersion liquid containing inorganic particles and a one-dimensional inorganic material on one surface or both surfaces of a porous substrate; and drying the coated porous substrate to form an inorganic composite layer, wherein the dimensions of the particles and the material are different, and the inorganic composite layer does not include a polymer-based organic binder.

Other features and aspects will be apparent from the following detailed description, the drawings, and the claims.

DESCRIPTION OF THE INVENTION

Hereinafter, the present invention will be described in detail. However, each of the following exemplary embodiments is merely one reference example for describing the present invention in detail, and the present invention is not limited thereto and may be implemented in various forms.

In addition, unless otherwise defined, all the technical terms and scientific terms used herein have the same meanings as commonly understood by those skilled in the art to which the present invention pertains. The terms used in the description of the present invention are merely used to effectively describe a specific exemplary embodiment, but are not intended to limit the present invention.

As used herein, a particle or material described as zero-dimensional or having a zero-dimensional shape has a shape in which the dimensions of the particle or material in all directions are the same, for example, a spherical shape. A particle or material described as one-dimensional or having a one-dimensional shape has a shape in which the dimensions of the particle or material in two directions are different, for example, a cylindrical or rod shape. A particle or material described as two-dimensional or having a two-dimensional shape has a shape in which the dimensions of the particle in three directions are different, for example, a rectangular flake shape or an elliptical flake shape. A particle or material described as three-dimensional or having a three-dimensional shape has a shape in which the dimensions of the particle or material in at least four directions are different, for example, a particle having a random shape.

A separator according to an exemplary embodiment of the present invention may include: (a) a porous substrate; and (b) an inorganic composite layer formed on one surface or both surfaces of the porous substrate, and including inorganic particles and a one-dimensional inorganic material, wherein the dimensions of the particles and the material are different, and the inorganic composite layer does not include a polymer-based organic binder.

In addition, a method of manufacturing a separator according to an exemplary embodiment of the present invention may include: (a) dispersing a one-dimensional inorganic material in a solvent to prepare a dispersion liquid; (b) dispersing inorganic particles in the dispersion liquid of (a); and (c) coating and drying the dispersion liquid of (b) on a surface of a porous substrate to form an inorganic composite layer, wherein the dimensions of the particles and the material are different, and the dispersion liquid used in the coating may not include a polymer-based organic binder.

In this case, the inorganic composite layer is not limited thereto, but may include two different types of materials such as an inorganic particle and an inorganic material at the same time. The inorganic particle has a zero-dimensional, two-dimensional, or three-dimensional shape and the inorganic material has a one-dimensional shape, which means that two materials having different dimensions may be included at the same time and the inorganic composite layer itself formed by coating a slurry in which the inorganic particles and the inorganic material are mixed may have a three-dimensional shape. In addition, the types of inorganic matters forming the inorganic particle and the inorganic material may be the same as or different from each other, but are not limited.

In the related art, when the inorganic particle layer is stacked on the porous substrate, if a polymer-based organic binder is not used, the inorganic particles are not sufficiently dispersed, and thus, an inorganic particle layer in which inorganic particles are bound to each other to form pores cannot be produced, and even when the inorganic particles are dispersed by applying an excessive energy, a sufficient adhesive force between the inorganic particles or between the inorganic particle layer and the porous substrate cannot be secured.

On the other hand, in the separator according to an exemplary embodiment of the present invention may include the inorganic composite layer in which the inorganic particles may be bound to each other to form pores even in a case where a polymer-based organic binder is not used, and the inorganic particles may be bound to each other, or the inorganic composite layer may be anchored and adhered to the porous substrate, by the one-dimensional inorganic material.

In addition, the inorganic composite layer may be formed on an area corresponding to 90% or more and specifically 95% or more of a total area of each of one surface or both surfaces of the porous substrate. More specifically, the inorganic composite layer may be formed on an area corresponding to 100% of the total area of each surface of the porous substrate except in the case where fine defects occur.

In the case of the separator according to an exemplary embodiment of the present invention, a binding force between the particles in the inorganic composite layer and an adhesive force between the porous substrate and the inorganic composite layer may be equal to or better than those of the separator according to the related art.

Hereinafter, the present invention will be described in more detail.

An exemplary embodiment of the present invention may provide a porous inorganic composite layer in which inorganic particles are strongly bound to each other and the porous inorganic composite layer and a porous substrate are strongly adhered to each other without using a polymer-based organic binder as compared with an inorganic particle layer including a polymer-based organic binder and inorganic particles according to the related art. Therefore, it is possible to provide a new separator capable of preventing ignition or rupture of a battery caused by an abnormal phenomenon such as a rapid rise in temperature due to its improved heat resistance.

In the separator according to an exemplary embodiment of the present invention, since pore clogging, swelling, and the like caused by the polymer-based organic binder according to the related art do not occur and migration of ions is excellent, there is no obstacle to migration of ions such as lithium ions, and electrical properties such as charge and discharge battery capacity or efficiency of a battery may be significantly improved.

In addition, an inorganic composite layer having remarkably improved heat resistance and chemical resistance and formed of only inorganic materials may be obtained, and an adhesive force between the inorganic particles or between the porous substrate and the inorganic composite layer may be sufficiently secured by the one-dimensional inorganic material.

Therefore, the separator according to the present invention may have excellent thermal stability, excellent electrochemical stability, excellent lithium ion conductivity, prevention of electrolyte contamination, and a preferred rate of electrolyte impregnation.

The inorganic composite layer including inorganic particles and a one-dimensional inorganic material may be formed on a porous substrate, for example, on one surface or both surfaces of a polyolefin-based porous substrate.

The inorganic composite layer is a porous layer in which inorganic particles are bound to each other to form pores on one surface or both surfaces of the porous substrate. Since a polymer-based organic binder is not used at all, it is possible to prevent a phenomenon of clogging or narrowing of pores occurring in an organic/inorganic composite separator including the inorganic particle layer according to the related art due to the polymer-based organic binder.

Figure 1:
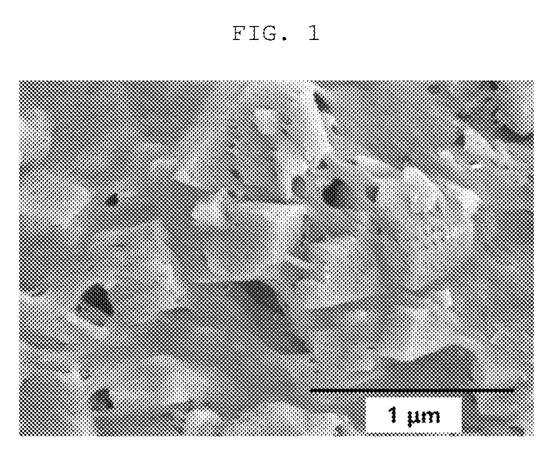
FIG. 1 is a photograph obtained by imaging an inorganic composite layer of a separator according to Example 1 of the present invention.
Figure 2:
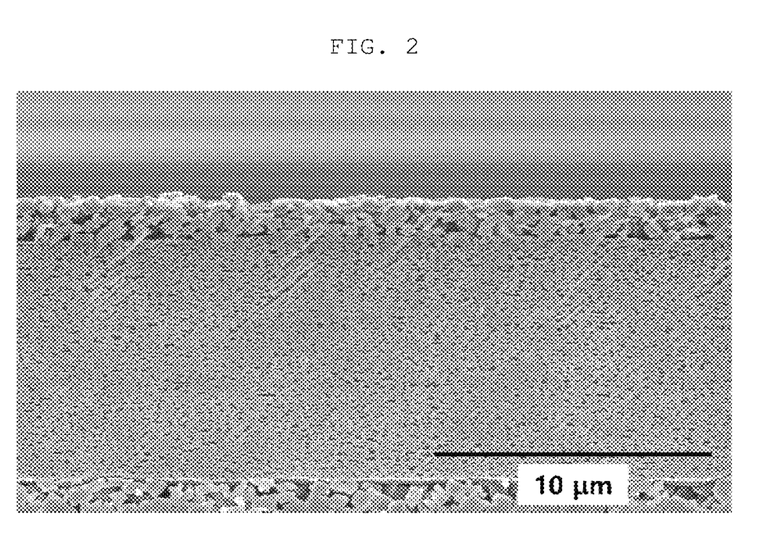
FIG. 2 is a photograph obtained by imaging a cross section of the separator according to Example 1 of the present invention.

The separator according to an exemplary embodiment of the present invention has a pore structure as illustrated in FIGS. 1 and 2. Lithium ions may smoothly migrate through the pores, and a large amount of an electrolyte may be filled in the pores to implement a high rate of impregnation, thereby achieving improvement in performance of a battery.

In addition, in the case of the electrochemical device including the separator in which a polymer-based organic binder is not used according to an exemplary embodiment of the present invention, the separator may not be easily ruptured inside the battery under excessive conditions due to internal or external factors such as a high temperature, over charging, and external impact, and the safety of the battery may be significantly improved, as compared with the organic/inorganic composite separator in which a polymer-based organic binder is used according to the related art.

In an exemplary embodiment of the present invention, the one-dimensional inorganic material may be one or two or more selected from an inorganic nanowire and an inorganic nanofiber.

In a case where the one-dimensional inorganic material has a structure in which a nanowire or nanofiber has a high surface area and a high length/diameter ratio (L/D), chemical bonding such as van der Waals bonding may be more smoothly performed by high surface contact between the one-dimensional inorganic material and the inorganic particles, the inorganic particles may be more smoothly tangled by the one-dimensional inorganic material, and pores may be more smoothly formed in the layer because the inorganic particles are more strongly fixed in contact with each other.

In addition, in the inorganic composite layer, the inorganic particles may be fixed to each other and not easily detached and an adhesive force between the inorganic particles may be significantly improved by secondary chemical bonding such as van der Waals bonding or entanglement.

In an exemplary embodiment of the present invention, it is preferable that a surface area of the one-dimensional inorganic material is as large as possible, for example, when a specific surface area of the one-dimensional inorganic material is 50 to 4,000 $m^2/g$, specifically, 300 to 4,000 $m^2/g$, and more specifically, 1,000 to 4,000 $m^2/g$, the chemical bonding such as van der Waals bonding is increased according to the surface area, and thus, entanglement between the one-dimensional inorganic materials, entanglement between the one-dimensional inorganic material and the surface of the porous substrate, and entanglement or physical bonding between the one-dimensional inorganic material and the particles may be further increased, and the adhesive force may be further increased. However, weak bonding may be performed depending on use, and the present invention is not limited thereto.

The one-dimensional inorganic material may have, for example, a diameter of 1 to 100 nm, a length of 0.01 to 100 μm, and a length/diameter ratio (L/D) of 100 to 20,000, but the present invention is not limited thereto.

In the present invention, the one-dimensional inorganic material is not particularly limited as long as it is chemically stable under a battery operating condition. For example, the one-dimensional inorganic material may be formed of one or two or more selected from a metal, carbon, metal oxide, metal nitride, metal carbide, metal carbonate, metal hydrate, and metal carbonitride, and more specifically, may be formed of one or two or more selected from boehmite, $Ga_2O_3$, SiC, $SiC_2$, quartz, NiSi, Ag, Au, Cu, Ag—Ni, ZnS, $Al_2O_3$, $TiO_2$, $CeO_2$, MgO, NiO, $Y_2O_3$, CaO, $SrTiO_3$, $SnO_2$, ZnO, and $ZrO_2$, but the present invention is not limited thereto.

The inorganic composite layer may also have an excellent adhesive force to the surface of the porous substrate. This is because the inorganic particles are fixed by entanglement and/or secondary chemical bonding such as van der Waals bonding between the one-dimensional inorganic materials, and the inorganic particles are also firmly fixed to the porous substrate through penetration and anchoring of the one-dimensional inorganic material into the inside of pores (micropores) formed in the porous substrate.

Therefore, in the separator according to an exemplary embodiment of the present invention, although the multi-dimensional heterogeneous material-based inorganic composite layer formed on one surface or both surfaces of the porous substrate is formed of only inorganic materials, breakage or separation of the inorganic particles may not occur, and excellent adhesive force may be exhibited.

In an exemplary embodiment of the present invention, the inorganic material may be formed of one or two or more selected from metal oxide, metal nitride, metal carbide, metal carbonate, metal hydrate, and metal carbonitride, and specifically, may be formed of one or two or more selected from boehmite, $Al_2O_3$, $TiO_2$, $CeO_2$, MgO, NiO, $Y_2O_3$, CaO, $SrTiO_3$, $SnO_2$, ZnO, and $ZrO_2$, but the present invention is not limited thereto as long as the performance of the battery is not significantly affected by electrochemical instability.

A size of the largest dimension of the inorganic particle is not limited as long as the object of the present invention is achieved, but may be, for example, 0.001 to 20 μm, and specifically, may be 0.001 to 10 μm.

The shape of the inorganic particle is not limited as long as the object of the present invention is achieved, and examples thereof may include a spherical shape, a square shape, an elliptical shape, a random shape, and a mixture thereof.

Compositions of the inorganic particles and the one-dimensional inorganic material in the inorganic composite layer are not limited as long as the object of the present invention is achieved, but for example, a content of the inorganic particles may be 50 to 99.5 wt %, specifically, 60 to 99 wt %, more specifically, 70 to 99 wt %, and still more specifically, 80 to 99 wt %, with respect to a total weight of the inorganic composite layer. Within the above range, a binding force between an active inorganic composite layer and a substrate layer and an effect of fixing the inorganic particles may be more sufficiently exhibited and the physical properties desired in the present invention may be further improved.

In an exemplary embodiment of the present invention, the inorganic composite layer more preferably includes only inorganic particles as particles, but may be an inorganic composite layer further including organic particles, if necessary, to form pores. In this case, the organic particle may be a polyethylene particle or the like, but the type of the organic particle is not particularly limited as long as electrochemical stability is secured.

In addition, in a case where the inorganic composite layer includes organic particles, a content of the organic particles may be 0.1 to 40 parts by weight with respect to 100 parts by weight of the inorganic particles, but is not limited thereto as long as the object of the present invention is achieved.

In addition, a size of the organic particle may be used in the same range of that of the size of the inorganic particle.

In an exemplary embodiment of the present invention, the inorganic composite layer may further include other commonly known additives in addition to the inorganic particles and the one-dimensional inorganic material described above.

In an exemplary embodiment of the present invention, a porous polymer film formed of a polymer used for the separator, a sheet, a non-woven fabric, a woven fabric, and the like may be variously used for the porous substrate, and a porous substrate having a stacked structure obtained by stacking two or more layers may be used.

A material of the porous substrate is not particularly limited as long as it is a polymer material used in the field of a secondary battery, but for example, a polyolefin-based porous substrate may be used. Specifically, examples of the porous substrate may include a porous film, sheet, and non-woven formed of low-density polyethylene, linear low-density polyethylene, high-density polyethylene, ultra-high molecular weight polyethylene, polypropylene, and copolymers thereof or derivatives thereof.

A thickness of the porous substrate is not particularly limited as long as the object of the present invention is achieved, but may be 1 to 100 μm, preferably 5 to 60 μm, and more preferably 5 to 30 μm. In addition, as for a pore size and a porosity of the porous substrate, for example, the pore size (diameter) may be 0.01 to 20 μm, and specifically, 0.05 to 5 μm, and the porosity may be 5 to 95%, and specifically, 30 to 60%, but the present invention is not limited thereto.

In an exemplary embodiment of the present invention, a thickness of the inorganic composite layer is not particularly limited as long as the inorganic particles are adjacent to each other to form pores, but may be, 0.01 to 50 μm.

In an exemplary embodiment of the present invention, a pore size and a porosity of the separator inorganic composite layer are determined depending on the size of the inorganic particle and the diameter of the one-dimensional inorganic material and the overall pore size and porosity of the separator including the substrate are not particularly limited, but the overall pore size and porosity of the separator may be, for example, 0.001 to 10 μm and 5 to 95%, respectively.

In an exemplary embodiment of the present invention, a thickness of the separator is not particularly limited, but may be, for example, 5 to 100 μm, and specifically, 10 to 50 μm.

Hereinafter, a method of manufacturing a separator according to an exemplary embodiment of the present invention will be described.

The separator according to an exemplary embodiment of the present invention may be manufactured by preparing an inorganic particle dispersion liquid obtained by mixing inorganic particles and a one-dimensional inorganic material with each other and dispersing the inorganic particle dispersion liquid in a solvent, and coating and drying the inorganic particle dispersion liquid on a porous substrate. In this case, the inorganic particles may be smoothly dispersed by the one-dimensional inorganic material without a polymer-based organic binder or a dispersion medium.

That is, in the case of the organic/inorganic composite separator according to the related art, in a case where an inorganic particle dispersion liquid is prepared, when a polymer-based organic binder is not used, the inorganic particles cannot be dispersed. In addition, even if a dispersion liquid is prepared by applying an excessive force, when the dispersion liquid is coated on a porous substrate, an adhesive force between the inorganic particles or between the inorganic particles and the porous substrate is significantly poor, and thus, the organic/inorganic composite separator cannot function as a separator.

On the other hand, in the method of manufacturing a separator according to an exemplary embodiment of the present invention, a mixture of inorganic particles or particles including inorganic particles and a one-dimensional inorganic material is dispersed. In this case, the particles may be sufficiently dispersed as in the case using the polymer-based organic binder according to the related art, and the problems occurring when using the polymer-based organic binder according to the related art may also be solved.

Therefore, it is confirmed that in a case where one surface or both surfaces of the porous substrate are coated using the dispersion liquid to stack the inorganic composite layer, an adhesive force to the porous substrate and an adhesive force between the particles are significantly excellent.

The method of manufacturing a separator according to an exemplary embodiment of the present invention may include: coating a dispersion liquid containing inorganic particles and a one-dimensional inorganic material on one surface or both surfaces of a porous substrate; and drying the coated porous substrate to form a inorganic composite layer, wherein the dimensions of the particles and the material are different, and the inorganic composite layer does not include a polymer-based organic binder.

Specifically, the method of manufacturing a separator according to an exemplary embodiment of the present invention may include: (a) dispersing a one-dimensional inorganic material in a solvent to prepare a dispersion liquid; (b) adding and dispersing inorganic particles or particles including inorganic particles to and in the dispersion liquid of (a); and (c) coating and drying the dispersion liquid of (b) on an entire or partial surface of a porous substrate film to form an inorganic composite layer.

In addition, the method of manufacturing a separator according to an exemplary embodiment of the present invention may include: (a) adding and dispersing a one-dimensional inorganic material and inorganic particles to and in a solvent at the same time to prepare a dispersion liquid; and (b) coating and drying the dispersion liquid on an entire or partial surface of a porous substrate film.

As a dispersion medium (solvent) of the dispersion liquid forming the inorganic composite layer, water may be mainly used, and as other dispersion media (solvents), lower alcohols such as ethanol, methanol, and propanol, solvents such as dimethylformamide (DMF), acetone, tetrahydrofuran, diethyl ether, methylene chloride, N-methyl-2-pyrrolidone, hexane, and cyclohexane, and mixtures thereof may be used, but the present invention is not limited thereto.

It is preferable that an aggregate of the inorganic particles in the dispersion liquid prepared by mixing inorganic particles or particles including inorganic particles and a one-dimensional inorganic material with the dispersion medium (solvent) is crushed using a ball mill, a beads mill, a planetary mixer (grinding and mixing method through rotation and revolution), or the like. In this case, a crushing time is not particularly limited as long as the aggregate is sufficiently crushed, but may be, for example, 0.01 to 20 hours, and a particle size of the crushed inorganic particle is preferably 0.001 to 10 μm. However, the present invention is not limited thereto.

The dispersion liquid may be coated and dried on the porous substrate to obtain a porous separator including an inorganic composite layer formed on one surface or both surfaces of the porous substrate. Preferably, the dispersion liquid may be coated and dried on a polyolefin-based porous substrate film to obtain a separator according to the present invention.

The coating method is not particularly limited, but the coating may be performed by various methods such as knife coating, roll coating, die coating, and dip coating.

Since the description of the inorganic particle, the one-dimensional inorganic material, and the organic binder is the same as that described above with respect to the separator, a specific description thereof will be omitted.

The separator manufactured by the above manufacturing method may be used in an electrochemical device, for example, a separator of a lithium secondary battery. The electrochemical device is not particularly limited, and examples thereof may include a primary battery, a secondary battery, a fuel cell, and a capacitor.

In a case where the separator of the present invention is generally used in a battery, a general method of disposing and assembling an anode, a separator, and a cathode, and injecting an electrolyte is applied to complete manufacturing of a battery. Therefore, the manufacturing method will not be described in detail here.

A cathode active material of the present invention is not particularly limited as long as it is a general cathode active material used for a cathode of a secondary battery, and examples thereof may include lithiated magnesium oxide, lithiated cobalt oxide, lithiated nickel oxide, and a composite oxide obtained by a combination thereof.

An anode active material of the present invention is not particularly limited as long as it is a general anode active material used for an anode of a secondary battery, and examples thereof may include carbon-based materials such as a lithium metal, activated carbon, and graphite.

The cathode active material and the anode active material are bound to a cathode current collector and an anode current collector, respectively. An aluminum foil, a nickel foil, or the like may be used as the cathode current collector. The anode current collector is selected from copper, nickel, and the like, but is not limited thereto as long as it is generally used. Therefore, the present invention is not limited thereto.

The electrolyte to be used in the present invention is also not limited as long as it is used in this field. Therefore, the electrolyte will not be further described in the present invention.

Hereinafter, preferred examples are provided to assist in understanding the present invention, but the following examples are merely examples, and the scope of the present invention is not limited to the following examples.

[Physical Property Evaluation Method]

1. Evaluation of Peeling Force

A peeling strength between the porous substrate and the inorganic composite layer was measured by a 180° peel test method (ASTM D903) using a tensile tester (3343) manufactured by Instron Corporation.

2. Evaluation of Thermal Contraction Rate

A 10 cm×10 cm separator with MD and TD directions marked was left at each of 150° C., 160° C., and 170° C., for 1 hour, a reduction rate in area was measured, and then, a thermal contraction rate was calculated by the following Equations 1 and 2.

$$\text{Thermal contraction rate in MD direction (\%)}= ((\text{Length before heating}-\text{Length after heating})/ \text{Length before heating})\times 100 \quad \text{[Equation 1]}$$

$$\text{Thermal contraction rate in TD direction (\%)}= ((\text{Length before heating}-\text{Length after heating})/ \text{Length in axial direction before heating})\times 100 \quad \text{[Equation 2]}$$

3. Gurley Permeability

A Gurley permeability was calculated by the following Equation 3 by measuring a time in seconds for 100 cc air to pass through an area of 1 square inch of the separator according to the standard of ASTM D726 using a densometer manufactured by Toyo Seiki Seisaku-sho, Ltd.

$$\Delta\text{Gurley permeability (sec)}=\text{Gas permeability of separator}-\text{Gas permeability of porous substrate} \quad \text{[Equation 3]}$$

4. Electrochemical Properties of Battery

An impedance of each of batteries manufactured through each assembling process was measured using a charge/discharge cycle device as in the following method.

While maintaining a temperature of a chamber in which the battery was contained at room temperature (25° C.), the battery was charged at a constant current-constant voltage (CC-CV) of 4.2 V and then was discharged to 2.5 V by a method of measuring a lifespan and a resistance at room temperature. The charging and discharging were measured by performing 0.5 C charging and 0.5 C discharging from 4.2 V to 2.5 V. As for the resistance, an average value of DC-IR impedance values of each cycle during the charging and discharging process was measured, and a resistance standard deviation was calculated from each value. In addition, a resistance increase rate was calculated by the following Equation 4.

$$\text{Resistance increase rate (\%)}=((\text{Resistance of separator}-\text{Resistance of porous substrate})/\text{Resistance of porous substrate})\times 100 \quad [\text{Equation 4}]$$

Example 1

<Manufacturing of Separator>

Boehmite having an average particle diameter of 400 nm and 5 parts by weight of a boehmite nanowire having an average diameter of 4 nm and L/D of 350 with respect to 100 parts by weight of the boehmite were added to water to prepare a dispersion liquid having a solid content of 20 wt %.

The prepared dispersion liquid was bar-coated on both surfaces of a polyethylene film (porosity of 41%) having a thickness of 9 μm and drying was performed. A coating thickness of each surface was 1.2 μm. An average pore size and porosity of the manufactured separator were 0.04 μm and 45%, respectively, and a porosity of the coating layer was 56%.

FIGS. 1 and 2 are SEM photographs obtained by imaging the inorganic composite layer and a cross section of the separator according to Example 1. It could be appreciated from FIG. 1 that the particles were fixed by entanglement of the one-dimensional inorganic materials in the surface of the inorganic composite layer of the separator of Example 1. In addition, it could be appreciated from FIG. 2 that in the separator according to Example 1, the pores were formed well in both the porous substrate and the inorganic composite layer.

The results of measuring the total coating thickness, the thermal contraction rate, the Gurley permeability increase rate, and the peeling force of the manufactured separator are shown in Table 1.

<Production of Cathode>

94 wt % of $LiCoO_2$, 2.5 wt % of Polyvinylidene fluoride, and 3.5 wt % of carbon black were added to N-methyl-2-pyrrolidone (NMP) and stirring was performed to prepare a cathode slurry. The slurry was coated on an aluminum foil having a thickness of 30 μm, drying was performed at a temperature of 120° C., and compression was performed, thereby producing a cathode plate having a thickness of 150 μm.

<Production of Anode>

95 wt % of artificial graphite, 3 wt % of acrylic latex (trade name: BM900B™ acrylic latex, solid content: 20 wt %) having a Tg of −52° C., and 2 wt % of carboxymethyl cellulose (CMC) were added to water and stirring was performed to prepare to prepare an anode slurry. The slurry was coated on a copper foil having a thickness of 20 μm, drying was performed at a temperature of 120° C., and compression was performed, thereby producing an anode plate having a thickness of 150 μm.

<Manufacturing of Battery>

A pouch type battery was assembled using the produced cathode, anode, and separator in a stacking manner. An ethylene carbonate/ethylmethyl carbonate/dimethyl carbonate (volume ratio of 3:5:2) electrolyte in which 1 M lithium hexafluorophosphate ($LiPF_6$) was dissolved was injected into the assembled battery to manufacture a pouch type lithium ion secondary battery having a capacity of 80 mAh. The resistance and resistance increase rate of the manufactured battery are shown in Table 1.

Example 2

Example 2 was performed in the same manner as that of Example 1 except that the content of the boehmite nanowire in the manufacturing of the separator was 10 parts by weight. The results are shown in Table 1.

Example 3

Example 3 was performed in the same manner as that of Example 1 except that the content of the boehmite nanowire in the manufacturing of the separator was 15 parts by weight. The results are shown in Table 1.

Comparative Example 1

100 parts by weight of boehmite having an average particle diameter of 400 nm and 1 part by weight of a surfactant (DISPERBYK®-102, manufactured by BYK) were added to water and dispersing was performed by a beads mill for 5 minutes to prepare a slurry. An anionic acrylic resin aqueous solution (15%) was added to the slurry so that an anionic acrylic resin (weight average molecular weight: 450,000 g/mol, manufactured by AEKYUNG CHEMICAL Co., Ltd) was 3 parts by weight, and stirring was vigorously performed through magnetron stirring, thereby preparing an aqueous slurry having a solid content of 20 wt %.

The slurry was coated on both the surfaces of the polyethylene substrate of Example 1 and drying was performed to manufacture a separator having a coating thickness of each surface of 1.2 μm.

Figure 3:
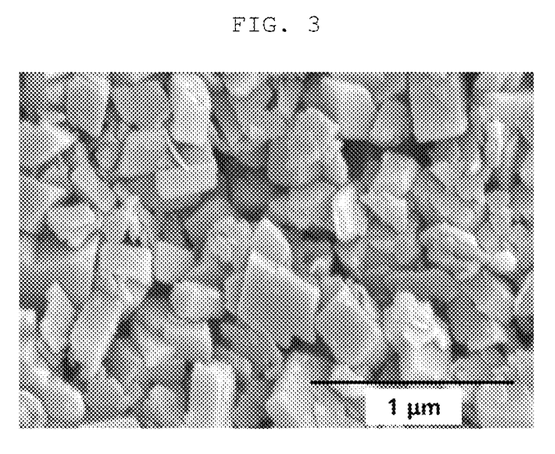
FIG. 3 is a photograph obtained by imaging an inorganic composite layer of a separator according to Comparative Example 1.
Figure 4:
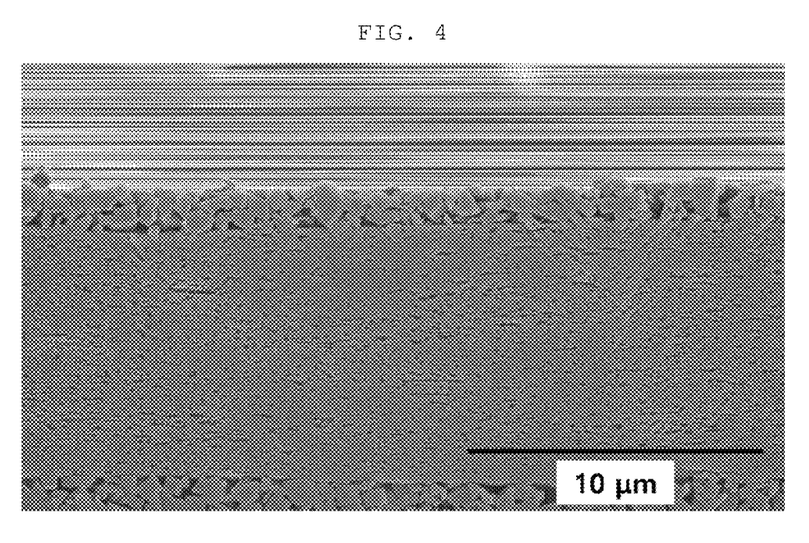
FIG. 4 is a photograph obtained by imaging a cross section of the separator according to Comparative Example 1.

FIGS. 3 and 4 are SEM photographs obtained by imaging the inorganic composite layer and a cross section of the separator according to Comparative Example 1.

The results of measuring the total coating thickness, the thermal contraction rate, the Gurley permeability increase rate, and the peeling force of the manufactured separator and the results of measuring the resistance and resistance increase rate of the battery manufactured in the same manner as that of Example 1 are shown in Table 1.

Comparative Example 2

Comparative Example 2 was performed in the same manner as that of Comparative Example 1 except that the content of the anionic acrylic resin was 5 parts by weight in Comparative Example 1. The results are shown in Table 1.

TABLE 1

| | Physical properties of separator | | | | | Battery | | |
|---|---|---|---|---|---|---|---|---|
| | Thick-ness | Thermal contraction rate (%) (TD %) | | | ΔGurley permeability | Peeling force | Resistance (mΩ) | | Resistance increase rate |
| | μm | 150° C. | 160° C. | 170° C. | sec/ 100 cc | gf/25 mm | Average | Standard deviation | % |
| Example 1 | 2.4 | <1 | <1 | <1 | 19 | 85 | 1399 | 9.5 | 1.27 |
| Example 2 | 2.4 | <1 | <1 | <1 | 44 | 95 | 1433 | 26 | 3.73 |
| Example 3 | 2.4 | <1 | <1 | <1 | 65 | 180 | 1462 | 31 | 5.85 |
| Comparative Example 1 | 2.4 | 9 | 12 | 20 | 38 | 28 | 1412 | 50 | 2.21 |
| Comparative Example 2 | 2.4 | 3 | 6 | 10 | 90 | 39 | 1534 | 95 | 11.04 |

Referring to Table 1, it could be confirmed that as a separator including (a) a porous substrate and (b) an inorganic composite layer formed on one surface or both surfaces of the porous substrate and including inorganic particles and a one-dimensional inorganic material, in the separator of each of Examples 1 to 3 in which the dimensions of the particles and the material are different, and the inorganic composite layer does not include a polymer-based organic binder, the heat resistance was excellent due to a significantly low thermal contraction rate, the Gurley permeability increase rate was significantly low as compared to that of each of the Comparative Examples in which the polymer-based organic binder was used, and the peeling force was significantly high, which showed that the adhesion was significantly improved.

That is, it was confirmed that in the separator of each of Examples 1 to 3, the Gurley permeability increase rate, the thermal contraction rate, and the peeling force were significantly improved at the same time, but in the Comparative Examples 1 and 2 in which the polymer-based organic binder was used, the Gurley permeability increase rate was significantly high, the thermal contraction rate was significantly high, and the peeling force was also significantly low, which showed that the adhesion was significantly deteriorated.

In addition, it could be confirmed that in the battery of each of Examples 1 to 3, the resistance was low, the standard deviation of the resistance was low, and the resistance increase rate was also significantly low. It is determined that the reason is that the electrochemical stability may be maintained in the electrolyte due to use of the one-dimensional inorganic material as compared with the case using the polymer-based organic binder.

Therefore, the separator according to an exemplary embodiment of the present invention includes the inorganic composite layer formed on the porous substrate and including the inorganic particles and the one-dimensional inorganic material, wherein the dimensions of the particles and the material are different, and the inorganic composite layer does not include a polymer-based organic binder, such that sufficient adhesion, gas permeability, significantly excellent thermal contraction, and excellent battery charge and discharge properties may be obtained even in a case where a polymer-based organic binder is not used at all.

As set forth above, the separator according to an exemplary embodiment of the present invention may have a sufficient adhesive force without using a polymer-based organic binder having insufficient chemical stability by adopting the porous inorganic composite layer formed on the porous substrate and obtained by mixing the inorganic particles and the one-dimensional inorganic material with each other.

Further, the separator according to an exemplary embodiment of the present invention may prevent ignition or rupture of a battery caused by an abnormal phenomenon such as a rapid rise in temperature due to its improved heat resistance.

Further, the separator according to an exemplary embodiment of the present invention may implement a fully inorganic active layer (an active layer formed of only inorganic particles and a one-dimensional inorganic material) having excellent adhesive properties without using a polymer-based organic binder, may implement no obstacle to migration of ions such as lithium ions due to significantly excellent ion migration, and may improve electrical properties such as charge and discharge battery capacity or efficiency of a battery. In addition, the heat resistance and the chemical resistance may be significantly increased and the adhesive force may be sufficiently secured by the inorganic composite layer formed of only fully inorganic matters.

Hereinabove, although the present invention has been described by specific matters, exemplary embodiments, and drawings, they have been provided only for assisting in the entire understanding of the present invention. Therefore, the present invention is not limited to the exemplary embodiments and the drawings. Various modifications and changes may be made by those skilled in the art to which the present invention pertains from this description.

Therefore, the spirit of the present invention should not be limited to these exemplary embodiments and drawings, but the claims and all modifications equal or equivalent to the claims are intended to fall within the spirit of the present invention.

What is claimed is:

1. A separator comprising:
   (a) a polyolefin-based porous substrate; and
   (b) an inorganic composite layer formed on one surface or both surfaces of the porous substrate, and comprising one or more inorganic particles and one or more one-dimensional inorganic materials,
   wherein the dimensions of the one or more inorganic particles and the one or more one-dimensional inorganic materials are different,
   wherein the one or more one-dimensional inorganic materials comprise inorganic nanowire(s) and/or inorganic nanofiber(s), wherein the one or more one-dimensional inorganic materials have a diameter of 1 to 100 nm, a length of 0.01 to 100 μm, and a length/diameter ratio (L/D) of 100 to 20,000
wherein a specific surface area of the one or more one-dimensional inorganic material is 50 to 4,000 m$^2$/g,
wherein the one or more inorganic particles are bound to each other, and/or the inorganic composite layer is anchored and adhered to the porous substrate, by the one or more one-dimensional inorganic materials, and the inorganic composite layer does not include a polymer-based organic binder.

2. The separator of claim 1, wherein a size of a largest dimension the inorganic particle is 0.001 to 20 μm.

3. The separator of claim 1, wherein a content of the inorganic particles is 50 to 99.9 wt % with respect to a total content of the inorganic particles and the one-dimensional inorganic material.

4. The separator of claim 1, wherein the inorganic composite layer further includes organic particles in an amount of 0.1 to 40 parts by weight with respect to 100 parts by weight of the inorganic particles.

5. The separator of claim 1, wherein the porous substrate is formed of one or more selected from the group consisting of high-density polyethylene, low-density polyethylene, linear low-density polyethylene, ultra-high molecular weight polyethylene, polypropylene, and copolymers thereof.

6. The separator of claim 1, wherein a thickness of the separator is 5 to 100 μm.

7. The separator of claim 1, wherein a pore size of the separator is 0.001 to 10 μm, and a porosity of the separator is 5 to 95%.

8. The separator of claim 1, wherein the one-dimensional inorganic material is formed of one or two or more selected from a metal, carbon, metal oxide, metal nitride, metal carbide, metal carbonate, metal hydrate, and metal carbonitride.

9. The separator of claim 8, wherein the one-dimensional inorganic material is formed of one or two or more selected from boehmite, $Ga_2O_3$, SiC, $SiC_2$, quartz, NiSi, Ag, Au, Cu, Ag—Ni, ZnS, $Al_2O_3$, $TiO_2$, $CeO_2$, MgO, NiO, $Y_2O_3$, CaO, $SrTiO_3$, $SnO_2$, ZnO, and $ZrO_2$.

10. The separator of claim 1, wherein the inorganic particle is formed of one or two or more selected from metal oxide, metal nitride, metal carbide, metal carbonate, metal hydrate, and metal carbonitride.

11. The separator of claim 10, wherein the inorganic particle is formed of one or two or more selected from boehmite, $Al_2O_3$, $TiO_2$, $CeO_2$, MgO, NiO, $Y_2O_3$, CaO, $SrTiO_3$, $SnO_2$, ZnO, and $ZrO_2$.

12. An electrochemical device comprising a cathode, an anode, the separator of claim 1, and an electrolyte.

13. The electrochemical device of claim 12, wherein the electrochemical device is a lithium secondary battery.

14. A method of manufacturing a separator, comprising:
coating a dispersion liquid comprising one or more inorganic particles and one or more one-dimensional inorganic materials on one surface or both surfaces of a polyolefin-based porous substrate; and
drying the coated porous substrate to form an inorganic composite layer, wherein the dimensions of the one or more inorganic particles and the one or more one-dimensional inorganic materials are different,
wherein the one or more one-dimensional inorganic materials comprise inorganic nanowire(s) and/or inorganic nanofiber(s),
wherein the one or more one-dimensional inorganic materials have a diameter of 1 to 100 nm, a length of 0.01 to 100 μm, and a length/diameter ratio (L/D) of 100 to 20,000,
wherein a specific surface area of the one or more one-dimensional inorganic material is 50 to 4,000 m$^2$/g,
wherein the one or more inorganic particles are bound to each other, and/or the inorganic composite layer is anchored and adhered to the porous substrate, by the one or more one-dimensional inorganic materials, and
the inorganic composite layer does not include a polymer-based organic binder.

* * * * *